United States Patent [19]

Okumura et al.

[11] Patent Number: 4,866,569
[45] Date of Patent: Sep. 12, 1989

[54] GAS-INSULATED SWITCHGEAR APPARATUS

[75] Inventors: Kiyoshi Okumura; Kazuaki Oishi, both of Hitachi, Japan

[73] Assignee: Hitachi, Ltd., Tokyo, Japan

[21] Appl. No.: 256,065

[22] Filed: Oct. 7, 1988

Related U.S. Application Data

[63] Continuation of Ser. No. 73,095, Jul. 14, 1987, abandoned.

[30] Foreign Application Priority Data

Jul. 15, 1986 [JP] Japan .................. 61-164803

[51] Int. Cl.$^4$ .............................................. H02B 1/04
[52] U.S. Cl. .................... 361/335; 307/147; 361/332; 361/394
[58] Field of Search ............... 307/112, 113, 147, 148; 174/17 CF; 361/331–337, 341–344, 364, 393, 394

[56] References Cited

U.S. PATENT DOCUMENTS 4,237,520 12/1980 Oishi .................... 361/341
4,241,379 12/1980 Olsen ................... 361/335

FOREIGN PATENT DOCUMENTS

| 57-20285 | 12/1982 | Japan . |
| 59-9714 | 1/1984 | Japan . |
| 106809 | 6/1984 | Japan . |
| 107513 | 7/1984 | Japan . |

OTHER PUBLICATIONS

Electric Railways, vol. 39, No. 9, p. 16, FIG. 4, 6/84.

Primary Examiner—Gerald P. Tolin
Attorney, Agent, or Firm—Antonelli, Terry & Wands

[57] ABSTRACT

A gas-insulated switchgear apparatus comprising two power-receiving units with a cable head on power-receiving side, a wattage metering unit, and two lead-out units with a cable head on lead-out side. The two power-receiving units are arranged on one side of the wattage metering unit, and the two lead-out units on the other side. The gas-insulated switchgear apparatus is thus simplified, electrical connection facilitated between the units, and the floor space of the whole apparatus reduced.

10 Claims, 3 Drawing Sheets

GAS-INSULATED SWITCHGEAR APPARATUS

This application is a continuation Ser. No. 073,095, filed July 14, 1987, now abandoned.

BACKGROUND OF THE INVENTION

1. FIELD OF THE INVENTION

The present invention relates to a gas-insulated switchgear apparatus (hereinafter referred to as "GIS"), or more in particular to a configuration of GIS suitable for power-receiving equipment.

2. DESCRIPTION OF THE PRIOR ART

A conventional two-channel lead-in two-bank GIS for power receiving is introduced, for example, in "Electric Railways" Vol. 39, No. 9, dated Sept. 1985, at page 16, FIG. 4, and is shown in FIG. 1 accompanying this specification. In this skelton diagram, the apparatus has an aligned-panel configuration comprising power-receiving units A, E including devices on the lead-in wire side arranged in one box-like case containing a low-pressure insulating gas sealed therein for each channel, units B, D on the lead-out side including devices connected with a transformer which are contained in one box-like case having a low-pressure insulating gas sealed therein, and a unit C with a wattage-metering instrument (hereinafter referred to as "MOF") involved contained in a single box-like case.

A conventional GIS having this circuit configuration comprises the power-receiving units A, E on the outermost side, the lead-out units B, D at inwardly adjacent positions thereto, and the MOF unit C at the central part in an aligned configuration.

The aforementioned configuration is also called a cubicle-type GIS generally. Among these devices, all the devices of the power-receiving units A, E and the lead-out units B, D are arranged in a gas-segmented box-like case as disclosed in JP-A-57-202805 and JP-A-59-106809 as well known. For the power-receiving units A, E, in particular, the above-cited reference in its Table 1 at page 18, Japanese Utility Model Laid-Open No. 9714/84 and Japanese Utility Model Laid-Open No. 107513/84, disclose a configuration in which only circuit breakers such as a vacuum circuit breaker or a gas circuit breaker are arranged in the air section outside of the gas segments of the box-like case. Bushings and cable heads are used as insulation lead means for these units. Also, the MOF unit C includes an oil-filled or gas-insulated MOF 1 used in the box-like case, and is connected with the other units A, B, D and E.

In the conventional aligned configuration in which the power-receiving units A and E are disposed on both sides with the lead-out units positioned inwardly thereof, however, the buses 10 and 11 for connecting these two types of units are required to be extended through the MOF C. Further, the buses 10, 11 are required to be connected with the MOF 1 by a bus 12, resulting in a large volume of the box-like case for sealing the insulating gas of the respective units. Also, the lead-in system on the power-receiving side generally includes a bushing or cable. The above-mentioned conventional GIS uses the former system, in view of the fact that the latter system, inspite of its advantages, leads to a problem of a larger floor space required.

SUMMARY OF THE INVENTION

Accordingly, it is an object of the present invention to provide a two-channel lead-in two-bank GIS configuration comprising power-receiving units, an MOF unit and lead-out units wherein electrical connection between these units are facilitated.

Another object of the present invention is to provide a GIS configuration comprising power-receiving units, an MOF unit and lead-out units which is simplified thereby to reduce the whole floor space of installation.

According to the present invention, there is provided a GIS configuration comprising two power-receiving units with cable head on the power-receiving or incoming side, an MOF unit, and two lead-out units with cable head on lead-out or outgoing side, in which the two power-receiving units are disposed on one side and the two lead-out units on the other side of the MOF unit.

Generally, in this type of aligned-panel configuration, respective devices are housed to make up units in box-like cases of substantially the same height and depth. Nevertheless, the power-receiving side has a circuit breaker while the lead-out side has none. The configuration according to the present invention with the power-receiving units placed adjacently to each other simplifies both the bus connecting the units and the construction in the box-like case on the lead-out side. As a result, the floor space required for the whole system is reduced, or in the best case, the floor space required for the lead-out units is reduced to almost one half as compared with the conventional configurations.

DESCRIPTION OF THE PREFERRED EMBODIMENTS

Figure 1:
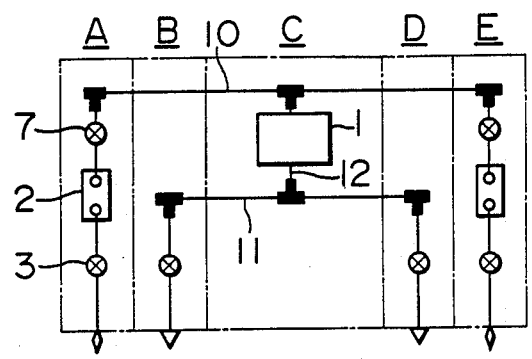
FIG. 1 is a skeleton diagram showing a circuit configuration of a conventional gas-insulated switchgear apparatus.

A GIS according to the present invention will be described below with reference to the embodiments shown in the accompanying drawings. As shown in a skeleton diagram of a GIS in FIG. 2, two power-receiving units A, E each include, almost in the same manner as in the conventional configurations, a cable head, and a circuit breaker 2 with disconnectors 3, 7 on the sides thereof, and these units A and E are arranged in adjacent relationship with each other and connected by a bus 10. The power-receiving units A and E are disposed only on one side (left side in the drawing) of an MOF unit C with an MOF 1 housed therein, and are connected to the MOF 1 by a bus 12a. The lead-out units B, D each also include, substantially in the same manner as in the conventional configurations, a disconnector 5 and a cable head 6. These two units B and D are disposed adjacently to each other and are connected by a bus 11. These lead-out units B and D are arranged unilaterally on the other side (on the right side in the drawing) of the MOF unit C and are connected to the MOF 1 by a bus 12b. Consequently, in the GIS according to the present invention wherein the power-receiving units A, E and the lead-out units B, D are concentrated on the left and right sides of the MOF unit C respectively, the units A and E or the B and D in adjacent relationship with each other respectively are connected in simplified way, and so are the connections of each of these units and the MOF unit C. By thus simplifying the connections between the units A to E, the construction of the apparatus is also simplified and reduced in size, thereby reducing the floor space occupied by the whole GIS. The buses 12a, 12b of the MOF unit C, depending on whether MOF 1 is of oil-filled or gas-insulated type, may take the form of ordinary air bus or, as shown by the two-dot chain, a gas-insulated bus as desired.

Figure 3:
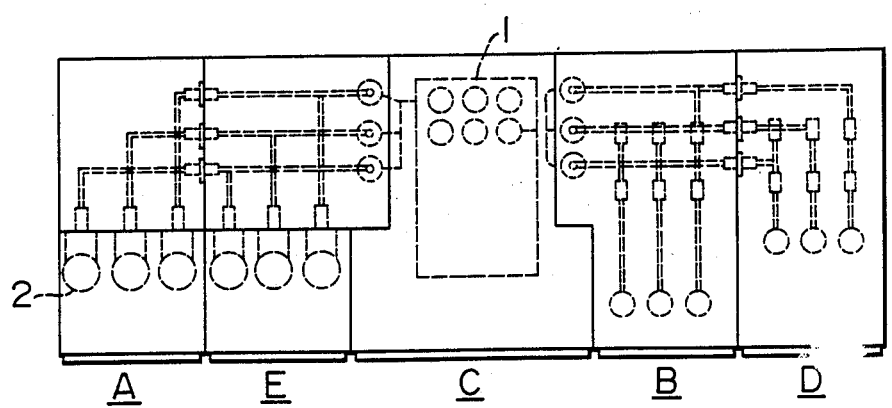
FIG. 3 is a plan view showing a gas-insulated switchgear apparatus according to an embodiment of the present invention realized with the circuit configuration of FIG. 2.
Figure 4:
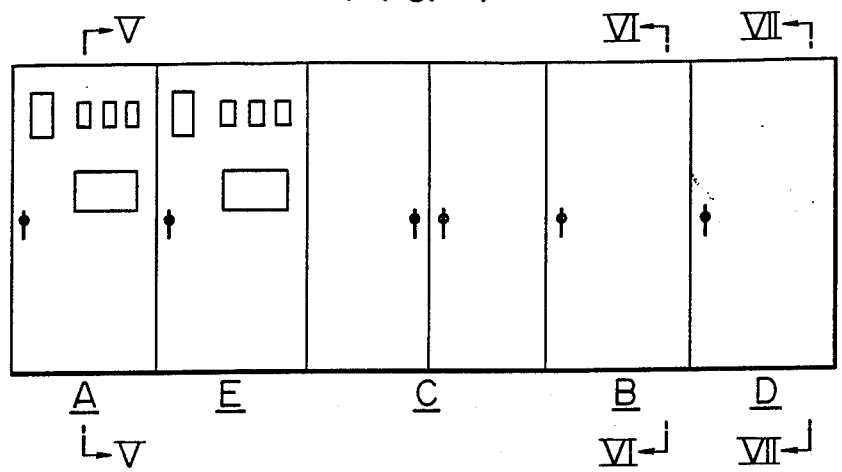
FIG. 4 is a front view of the circuit configuration shown in FIG. 3.

As shown in the plan view of FIG. 3 and the front view of FIG. 4, the units A to E of the above-described GIS are aligned from left to right in box-like cases, whereby the power-receiving and lead-out side devices may be concentrated thereby to achieve the above-mentioned superior effect.

The power-receiving unit A (the same applies to unit E) in the aforementioned aligned configuration will be explained with reference to FIG. 5, and the lead-out unit B, D with FIGS. 6 and 7.

Figure 2:
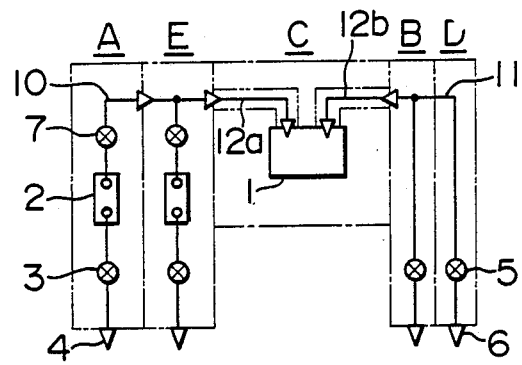
FIG. 2 is a skeleton diagram showing a circuit configuration of a gas-insulated switchgear apparatus according to the present invention.
Figure 5:
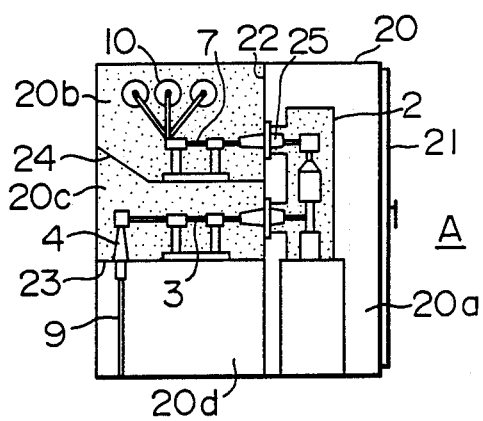
FIG. 5 is a longitudinal sectional view taken along the line V—V in FIG. 4.

The power-receiving unit A, as shown in FIG. 5, has the box-like case 20 segmented by a partition 22 into a door-side air chamber 20a and a deep chamber, which in turn is divided into two upper and lower hermetic chambers 20b, 20c and an air chamber 20d by means of two partitions 23, 24. These hermetic chambers 20b, 20c are sealed with an insulating gas like $SF_6$ under a pressure of about 1 kg/cm$^2$. The partition 22 has mounted thereon a pair of bushings 25 protruded into the hermetic chambers 20b, 20c. The bushing 25 is connected to a circuit breaker 2 arranged in the air chamber 20a, and the other side of the bushing 25 to a cable head 4 and the bus 10 through disconnectors 3, 7 in the hermetic chambers 20b, 20c respectively. The bus 10 leads to the MOF 1 as shown in FIGS. 2 and 3, while the cable head 4 is connected to the transmission line through the cable 9 in the air chamber 20d.

Figure 6:
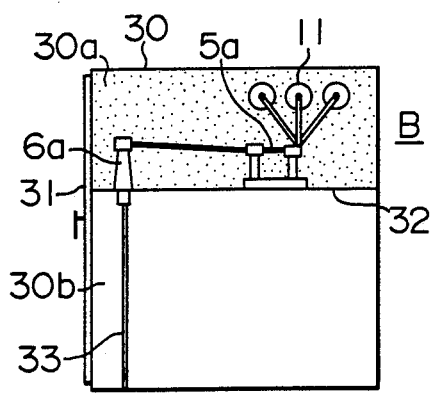
FIG. 6 is a longitudinal sectional view taken along the line VI—VI in FIG. 4.
Figure 7:
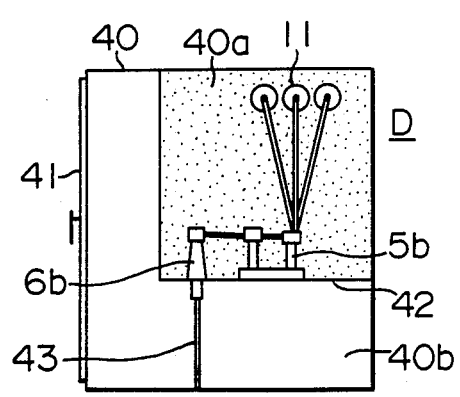
FIG. 7 is a longitudinal sectional view taken along the line VII—VII in FIG. 4.

The lead-out units B, D are configured in the manner shown in FIGS. 6 and 7. Specifically, one lead-out unit B has a box-like case 30 with a door 31, as shown in FIG. 6, which is segmented into an upper hermetic chamber 30a sealed with an insulating gas and a lower air chamber 30b. The hermetic chamber 30a has arranged therein a disconnector 5a connected to the bus 11 leading to the MOF 1 and a cable head 6a on the door 31 side. The cable head 6a is led outside by being connected with the cable 33 on the air room 30b side. The other lead-out unit D, by contrast, as shown in FIG. 7, has a box-like case 40 with a door 41, which is segmented by a substantially L-shaped partition 42 into a hermetic chamber 40a sealed with an insulating gas and an air chamber 40b around the two sides of the substantially L-shaped partition 42. This hermetic chamber 40a has arranged therein, as in the previously-described case, a disconnector 5b connected to the bus 11 and a cable head 6b of the door 41, which cable head 6b is connected to a cable arranged in the air room 30b. The style of the hermetic chamber 40a formed in the box-like case 40 may be changed as desired, and the position of the cable head 6b may also be adjusted appropriately.

The MOF unit C interposed between the power-receiving units A, E and the lead-out units B, D is formed of a box-like case of the same height and depth as the remainders taking the aligned configuration into consideration, and has arranged therein the MOF 1 of oil-filled or gas-insulated type, in such a manner that this particular unit is not desirably much different from the other units.

The units A to E, which are formed in the manner mentioned above, are configured in alignment as shown in FIGS. 3 and 4, with the power-receiving units A, E and the lead-out units B, D centralized respectively on the two sides of the MOF unit C. As a result, external connection and electrical connection between the units are simplified.

Figure 8:
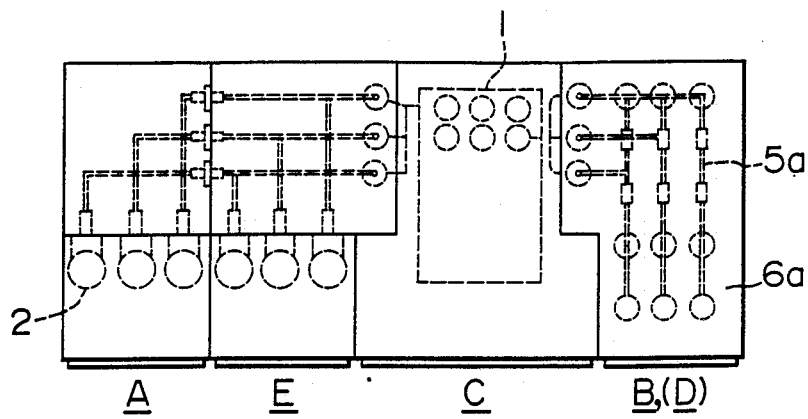
FIG. 8 is a plan view showing a gas-insulated switchgear apparatus according to the another embodiment of the present invention.
Figure 9:
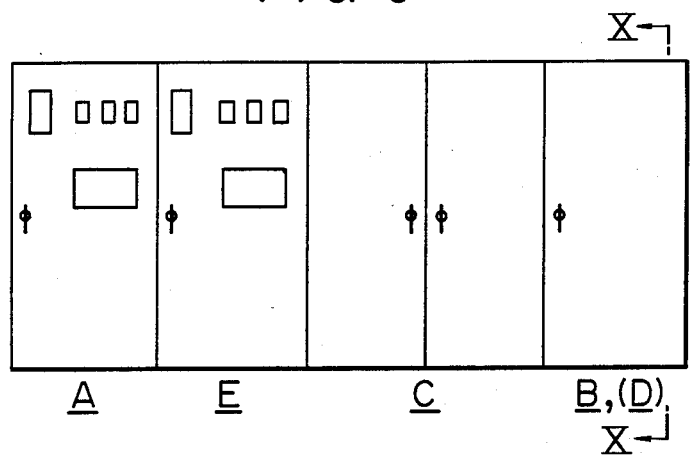
FIG. 9 is a front view of the apparatus shown in FIG. 8.
Figure 10:
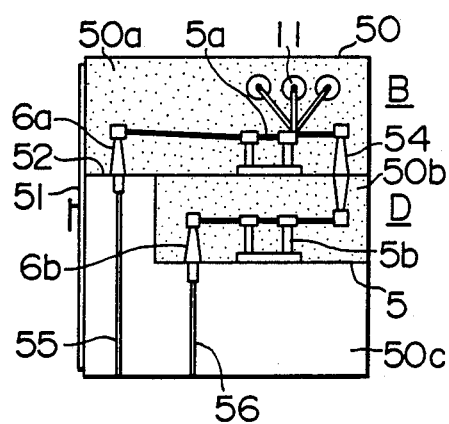
FIG. 10 is a longitudinal sectional view taken along the line X—X in FIG. 9.

Another embodiment of GIS according to the present invention is shown in FIGS. 8 and 9. In this embodiment, the power-receiving units A, E and the MOF unit C are arranged in the same configuration as the preceding embodiment. The lead-out units B, D, however, are collectively arranged in the manner described below. Specifically, the lead-out units arranged on the right side of the MOF unit C, as shown in FIG. 10, has a box-like case 50 with a door 51, which are segmented into two upper and lower hermetic chambers 50a, 50b sealed with an insulating gas and an air chamber 50c by substantially horizontal partitions 52, 53. The lead-out unit B is formed by use of the upper hermetic chamber 50a, and the lead-out unit D by use of the lower hermetic chamber 50b. The upper hermetic chamber 50a making up the lead-out unit B has arranged therein a disconnector 5a and a cable head 6a, and is connected to the MOF 1 through the bus 11. The hermetic chamber 50b making up the lead-out unit D, on the other hand, has arranged therein a disconnector 5b and a cable head 6b. For electrical connection of the units B and D, a bushing 54 is mounted on the partition 52, by use of which the disconnectors 5a and 5b are connected to each other, so that the lead-out unit D is connected to the MOF 1 through the bus 11. Each of the cable heads 6a, 6b is connected with cables 55, 56 respectively in the air chamber 50c, and lead to a transformer and the like not shown.

Although the upper and lower hermetic chambers 50a and 50b are defined by the partitions 52 and 53 in this embodiment, these hermetic chambers may alternatively communicated with each other by gas.

In this way, by arranging the power-receiving units A, E and the lead-out units B, D on the sides of the MOF unit C collectively respectively, the buses for connecting the power-receiving units A and E, or the MOF unit C and the power-receiving units A, E, may be laid without passing through the box-like cases of the lead-out units B, D. As a consequence, the interior construction of the box-like case 50 making up the lead-out units B, D is simplified, with the two lead-out units B and D housed therein in double stages as shown in FIG. 10.

The two power-receiving units A and E are configured on one side of the MOF unit C, and the two lead-out units B and D are arranged in two upper and lower stages within one box-like case on the other side of the MOF unit C, so that the buses for connecting the power-receiving units to each other and for connecting the power-receiving units and the MOF unit are simplified. At the same time, the floor space required for the lead-out units is reduced thereby to render the whole GIS less bulky.

According to the embodiments described above, the two power-receiving units are arranged on the left side and the two lead-out units on the right side of the MOF unit to make up a GIS. The units on the right and left side of the MOF unit arranged as above, however, may be replaced with each other with equal effect. Also, the arrangement of the parts of the power-receiving units and the lead-out units may be changed appropriately.

According to the present invention, there is provided a GIS configuration for simplifying the connection of two power-receiving units and also buses and the MOF unit to each other in an aligned construction, and therefore the floor space required for the whole apparatus is also reduced.

We claim:

1. A gas-insulated switchgear apparatus comprising:
two power-receiving units with a respective cable head on a power-receiving side;
two lead-out units with a respective cable head on a lead-out side; and
a wattage metering unit having a wattage metering apparatus connected to an electrical coupling part of each of said power-receiving units and each of said lead-out units, each of the units being constructed in a box-like case, wherein:
the lead-out and power-receiving units are positioned centering around the wattage metering unit and each of said power-receiving units is positioned at only one side of the wattage metering unit and each of said lead-out units is positioned at only the other side of the wattage metering unit and each of said power receiving units reaches the side of said wattage metering unit and contains at least disconnectors and a circuit breaker which are electrically connected from the cable head side and mounted within hermetic chambers sealed with an insulating gas in respective ones of said box-like cases;
each of said lead-out units contains a respective disconnector connected between the side of said wattage metering unit and a respective cable head, said disconnectors are within hermetic chambers sealed with an insulating gas in said box-like case;
each of said units is electrically connected to each other;
each of said power-receiving units includes a circuit breaker connected to a bus;
said circuit breaker is arranged vertically in an air chamber on a door side of a box-like case segmented by partitions;
a first disconnector is arranged in an upper hermetic chamber of said box-like case and connected to the bus side of said circuit breaker sealed with an insulating gas; and
a second disconnector is arranged in a lower hermetic chamber of said box-like case and connected to the cable head side of said circuit breaker.

2. A gas-insulated switchgear apparatus comprising:
two power-receiving units with a respective cable head on a power-receiving side;
two lead-out units with a respective cable head on a lead-out side; and
a wattage metering unit having a wattage metering apparatus connected to an electrical coupling part of each of said power-receiving units and each of said lead-out units, each of the units being constructed in a box-like case, wherein:
the lead-our and power-receiving units are positioned centering around the wattage metering unit;
said two power-receiving units formed by a first box-like case are positioned at only one side of the wattage metering unit;
said two lead-out units formed by a second box-like case are positioned at only the other side of the wattage metering unit;
each of said lead-out units includes a box-like case hermetically sealed with an insulating gas therein;
each of said lead-out units contains a disconnector connected between the side of said wattage metering unit and a respective cable head said disconnectors all within hermetic chambers sealed with insulating gas with each chamber being located in said box-like case;
each of said units is electrically connected to each other;
each of said power-receiving units includes a circuit breaker arranged vertically in an air chamber on a door side of a box-like case segmented by partitions;
a first disconnector is arranged in an upper hermetic chamber sealed with an insulating gas in said box-like case; and
a second disconnector is arranged in a far and lower hermetic chamber of the box-like case and connected to the cable head side of the circuit breaker at a side remote from said wattage measuring unit.

3. A gas-insulated switchgear apparatus comprising two power-receiving units with cable heads on a power-receiving side, a wattage metering unit, and two lead-out units with cable heads on a lead-out side, each including a box-like case, wherein said two power-receiving units are arranged on one side of said wattage metering unit, and said two lead-out units are arranged on the other side of said wattage metering unit, each of said power-receiving units including a circuit breaker arranged vertically in an air chamber on a door side of said box-like case, said box-like case being segmented by partitions, to form upper and lower hermetic chambers sealed with an insulating gas, a first disconnector arranged in said upper hermetic chamber and connected to a bus side of said circuit breaker, and a second disconnector arranged in said lower hermetic chamber and connected to a cable head of said circuit breaker, each of said lead-out units including a plurality of disconnectors arranged to have a longitudinal axis horizontally disposed in each of the hermetic chambers into which a box-like case is segmented by two partitions, an end on one side of each of said disconnectors being connected to a cable head, and ends on other sides thereof being connected to a bus.

4. A gas-insulated switch gear apparatus comprising:
a first box-like case including two power receiving units each having a cable head on a power receiving side and an electrical coupling part;
a second box-like case including two lead-out units each having a cable head on a lead-out side and an electrical coupling part;
a third box-like case including a wattage metering unit including a wattage metering apparatus connected to the electrical coupling parts of the power receiving units and of the lead-out units;

said power receiving units being positioned totally on one side of the wattage metering unit and said lead-out units being positioned totally on an opposite side of the wattage metering unit;

means connecting all of said units electrically together; wherein each of said lead-out units includes a single box-like case segmented into upper and lower hermetic chambers sealed with an insulating gas each having arranged therein a disconnector having two ends, the end on one side of each disconnector being connected to a cable head, the other end of each disconnector being connected to a bus disposed at an upper part of each chamber; and each of said power-receiving units includes a circuit breaker connected to said bus, said circuit breaker being arranged vertically in an air chamber on a door side of a box-like case segmented by partitions;

a first disconnector is arranged in an upper hermetic chamber of said box-like case and connected to the bus side of said circuit breakers sealed with an insulating gas, and a second disconnector is arranged in a lower hermetic chamber of said box-like case and connected to the cable head side of said circuit breaker.

5. A gas-insulated switchgear apparatus comprising:

two power-receiving units with a respective cable head on a power-receiving side;

two lead-out units with a respective cable head on a lead-out side; and a wattage metering unit having a wattage metering apparatus connected to an electrical coupling part of each of said power-receiving units and each of said lead-out units, each of the units being constructed in a box-like case, wherein:

the lead-out and power-receiving units are positioned centering around the wattage metering unit and said two power-receiving units comprised of a first box-like case are positioned at only one side of the wattage metering unit;

said two lead-out units comprised of a second box-like case are positioned at only one side of the wattage metering unit;

said two lead-out units are positioned in a single box-like case segmented by partitions into upper and lower hermetic chambers sealed with an insulating gas, and contain a disconnector connected between a side of said wattage metering unit and a respective said cable head, said disconnector is within a hermetic chamber; and each of said units is electrically connected to each other.

6. A gas-insulated switchgear apparatus according to claim 5, wherein said box-like case for the lead-out units is segmented by two partitions into hermetic chambers sealed with an insulating gas, each having therein a disconnector having two ends with one of said ends on one side thereof connected to a cable head, the end on another side thereof connected to a bus at an upper part.

7. A gas-insulated switchgear apparatus according to claim 5, wherein each of said power-receiving units includes a single box-like case segmented by partitions into an air chamber on a door side of said box-like case and having a circuit breaker vertically arranged therein, an upper hermetic chamber sealed with an insulating gas and having arranged therein a disconnector connected to a bus side of said circuit breaker, and a lower hermetic chamber sealed with an insulating gas and having arranged therein a disconnector connected to a cable head of said circuit breaker.

8. A gas-insulated switchgear apparatus comprising:

two power-receiving units with a respective cable head on a power-receiving side;

two lead-out units with a respective cable head on a lead-out side; and a wattage metering unit having a wattage metering apparatus connected to an electrical coupling part of each of said power-receiving units and each of said lead-out units, each of the units being constructed in a box-like case, wherein:

the lead-out and power-receiving units are positioned centering around the wattage metering unit;

said two power-receiving units respectively comprised of a box-like case are positioned at only one side of the wattage metering unit;

said two lead-out units comprised of a box-like case are positioned at the other side of the wattage metering unit;

said lead-out units are formed by segmenting a single box-like case by two substantially parallel partitions into hermetic chambers with different lengths each sealed with an insulating gas;

a disconnector connected between a side of said wattage metering unit and a respective said cable head in each hermetic chamber and arranged so that each cable head is substantially parallel; and each of said units is electrically connected to each other.

9. A gas-insulated switchgear apparatus according to claim 8, wherein said hermetic chambers each have arranged therein a disconnector that is horizontally disposed and having two ends on different sides, the end on one side of said disconnector being connected to a cable head, the end on another side thereof being connected to a bus.

10. A gas-insulated switchgear apparatus according to claim 8, wherein each of said power-receiving units includes a circuit breaker vertically arranged in an air chamber on a door side of a box-like case segmented by partitions, a first disconnector arranged in an upper hermetic chamber of said box-like case sealed with an insulating gas and connected to a bus side of said circuit breaker, and a second disconnector arranged in a lower hermetic chamber of said box-like case sealed with an insulating gas and connected to a cable head side of said circuit breaker.

* * * * *